United States Patent
Nagaoka et al.

(10) Patent No.: US 6,574,656 B1
(45) Date of Patent: Jun. 3, 2003

(54) NETWORK SYSTEM AND METHOD FOR LIMITING THE EXECUTION OF COMMANDS

(75) Inventors: Akihiro Nagaoka, Tokyo (JP); Mitsuhiko Nishimura, Ishikawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/420,550

(22) Filed: Oct. 19, 1999

(30) Foreign Application Priority Data

Oct. 19, 1998 (JP) .......................................... 10-315443

(51) Int. Cl.⁷ ............................................. G06F 15/16
(52) U.S. Cl. ........................ 709/201; 709/203; 709/225
(58) Field of Search ................................ 709/201, 203, 709/224, 225

(56) References Cited

U.S. PATENT DOCUMENTS

| | | | | |
|---|---|---|---|---|
| 5,940,590 A | * | 8/1999 | Lynne et al. ................ | 713/200 |
| 5,941,947 A | * | 8/1999 | Brown et al. ............... | 709/225 |
| 6,012,090 A | * | 1/2000 | Chung et al. ............... | 709/219 |
| 6,014,666 A | * | 1/2000 | Helland et al. .............. | 707/10 |
| 6,085,084 A | * | 7/2000 | Christmas ................... | 455/411 |
| 6,101,607 A | * | 8/2000 | Bachand et al. ............ | 709/328 |
| 6,125,384 A | * | 9/2000 | Brandt et al. ............... | 709/203 |
| 6,182,142 B1 | * | 1/2001 | Win et al. ................... | 709/219 |
| 6,389,543 B1 | * | 5/2002 | Dawson et al. ............. | 713/202 |

FOREIGN PATENT DOCUMENTS

| | | |
|---|---|---|
| JP | 4-117747 | 4/1992 |
| JP | 5-274266 | 10/1993 |
| JP | 7-79243 | 3/1995 |
| JP | 7-160637 | 6/1995 |
| JP | 7-219899 | 8/1995 |
| JP | 10-154118 | 6/1998 |

OTHER PUBLICATIONS

Article—Nikkei Communictaions, May 1, 1995, No. 197, pp. 51–55—"Directory that Becomes a Network Ledger to Grasp Everything" No translation.

* cited by examiner

Primary Examiner—Saleh Najjar
(74) Attorney, Agent, or Firm—Foley & Lardner

(57) ABSTRACT

In an issuing subsystem is stored a first set of authorization data including information on matching between an operator and a group the operator belongs to, and information on matching between a group and commands authorized for operators belonging to the group. As an operator enters a command, the issuing subsystem references the first set of authorization data, judges whether or not the operator is to be authorized to execute the command and, if it is judged that he or she is to be authorized, augments the command with information identifying the group to which the operator belongs, the augmented command being transmitted to an executing subsystem. The executing subsystem stores a second set of authorization data including information on matching between a group and commands authorized for execution in response to an execution request from the group. The executing subsystem, upon receiving a transaction command from the issuing subsystem, references the second set of authorization data, judges whether or not the command is to be authorized for execution in response to the request from the group whose command is augmented with identifying information and, if it is judged that it is to be authorized, executes the command.

23 Claims, 8 Drawing Sheets

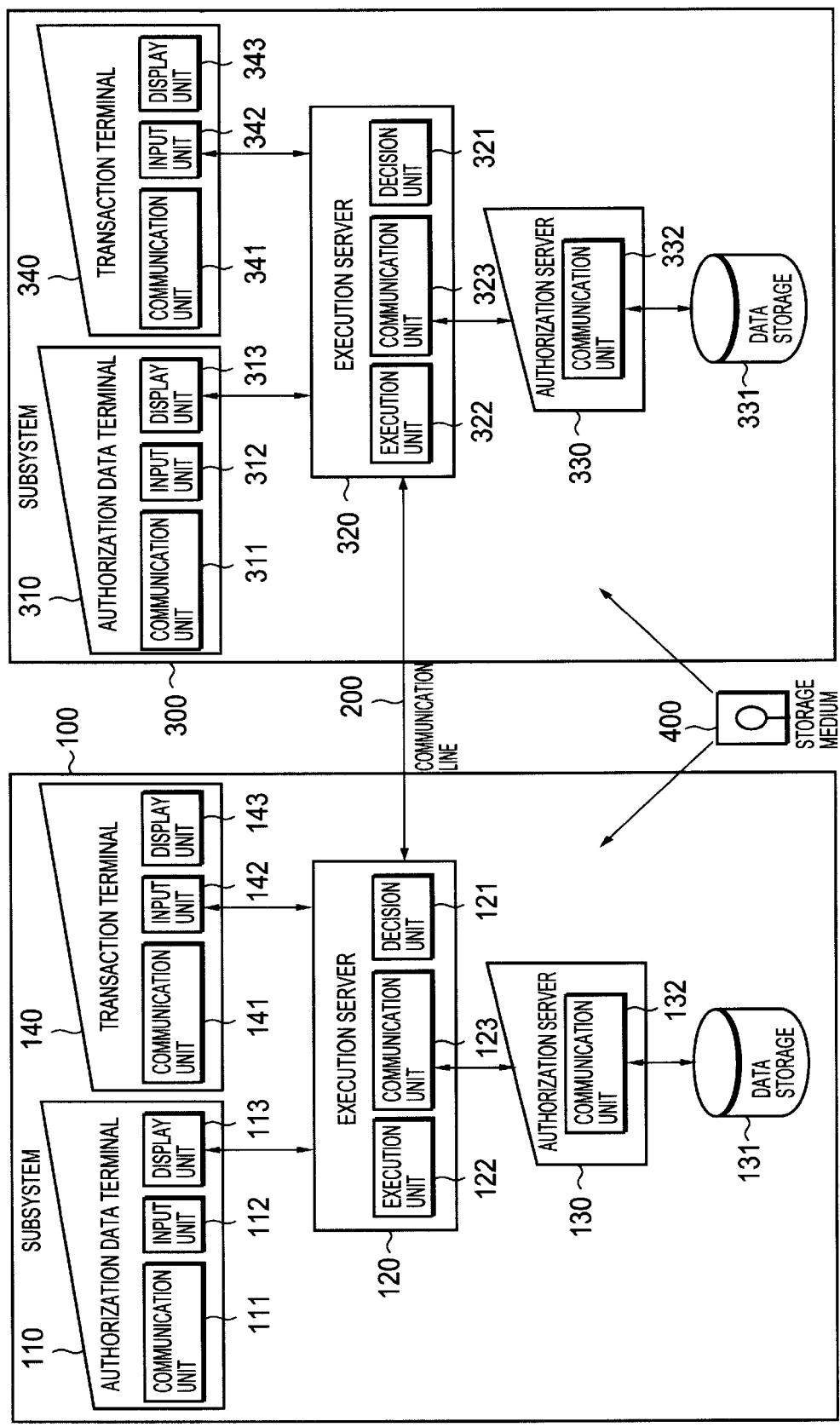

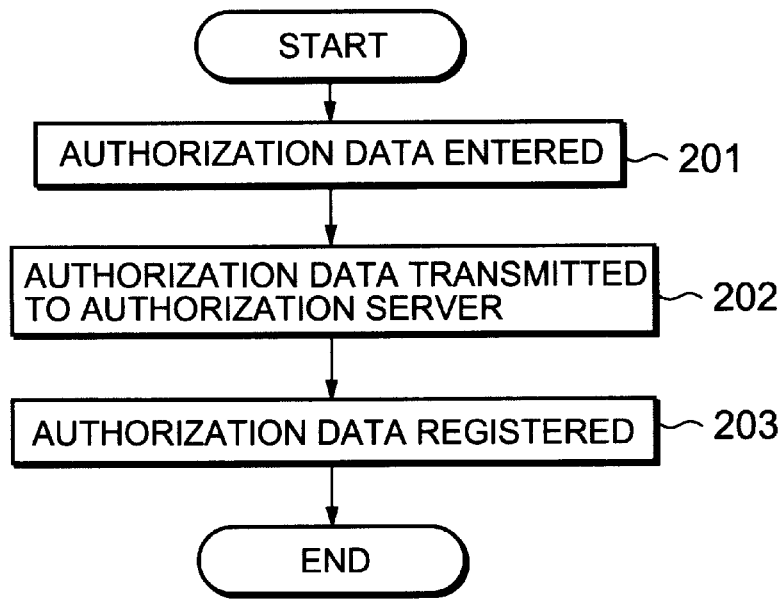
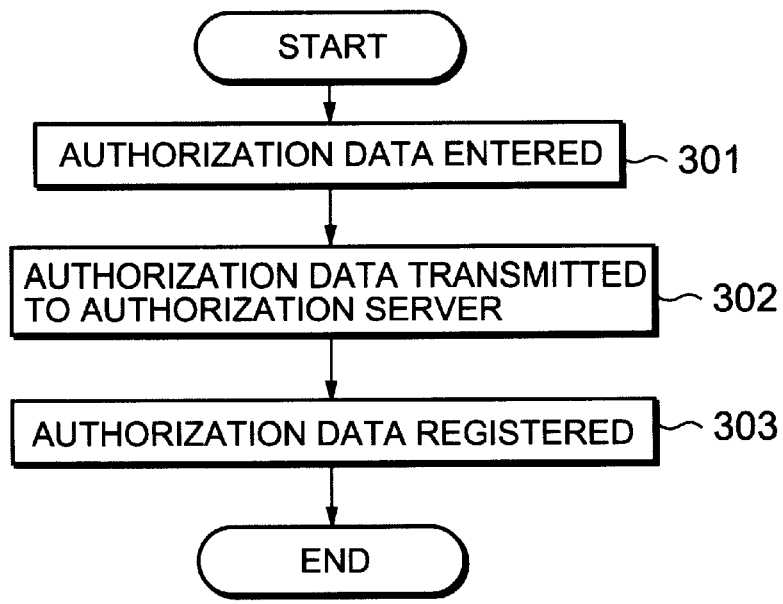

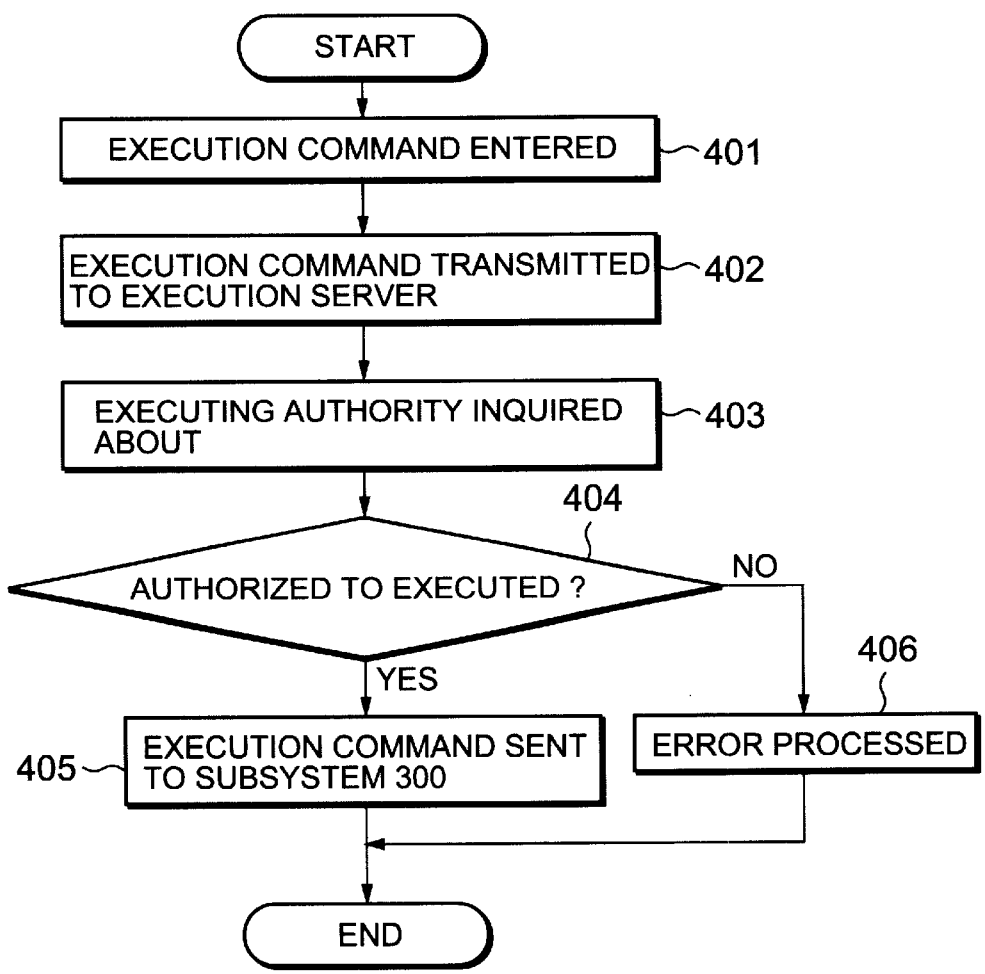

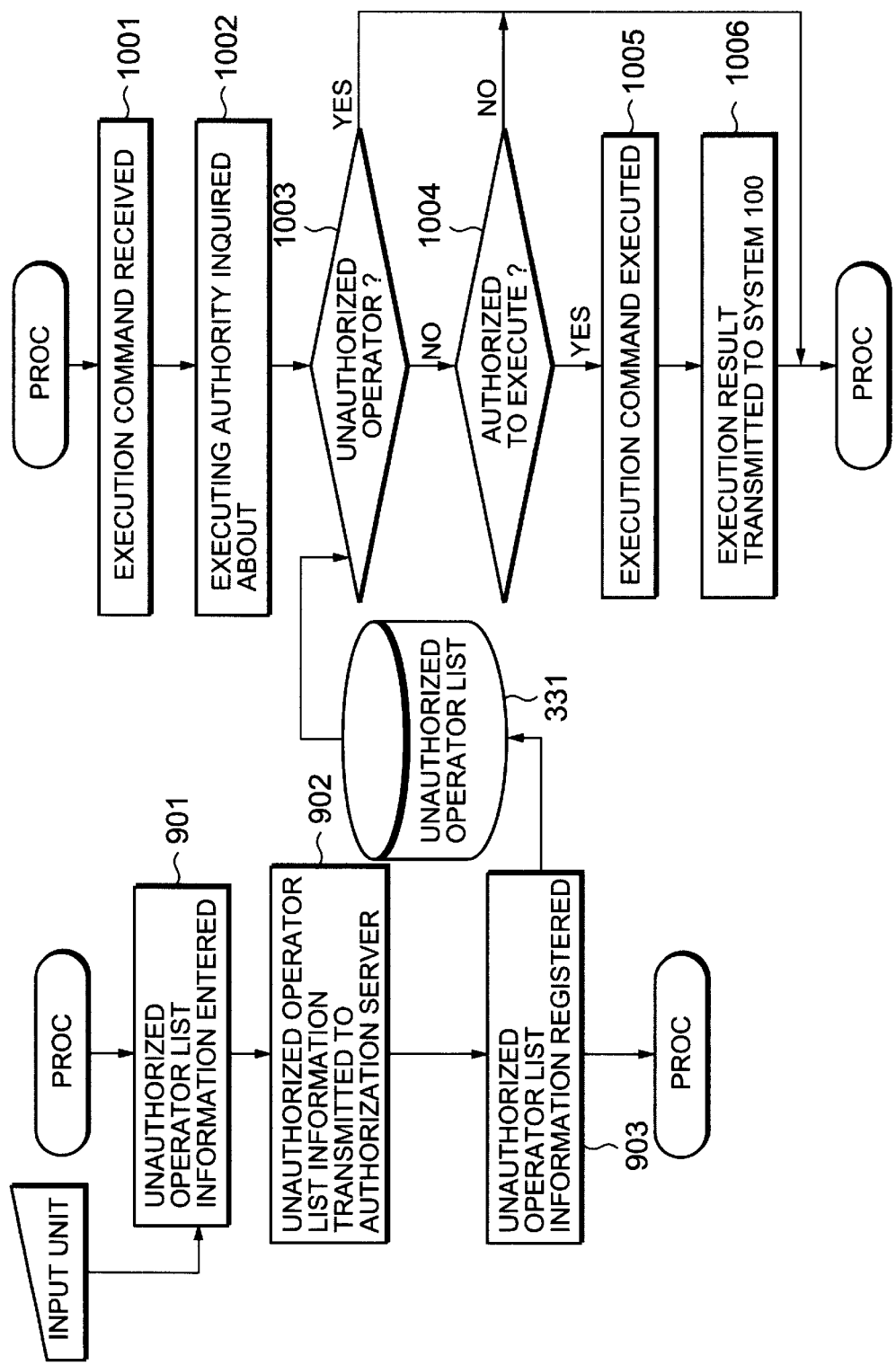

NETWORK SYSTEM AND METHOD FOR LIMITING THE EXECUTION OF COMMANDS

BACKGROUND OF THE INVENTION

1. Field of the Invention

The present invention relates to a network system and a method to limit, in a network system consisting of a plurality of computer systems with communication lines, the execution of transaction commands given from one to another of the plurality of computer systems.

2. Description of the Related Art

In a network system consisting of a plurality of computer systems connected via a wide area network or the like, for instance, decentralized data management system, computer systems are often installed correspondingly to groups using the respective computer systems. The "group" in this context may be a group of any size, ranging from a large organization such as a corporation to a small one such as a department or a section in a corporation. Conceivable ways of being "installed corresponding to groups" include installation of one computer system for each group, installation of one computer system for a plurality of groups, and installation of a plurality of computer systems for one group.

In such a network system, where information registered with the computer system of one group is to be referenced and updated from the computer system of another group, if every operator is allowed to perform such a transaction with no limitation at all, the reliability of data stored on the network may be hurt if any operator updates or otherwise manipulates any data wrongly either intentionally or by mistake.

Therefore, to avoid such trouble, it is necessary to supplement each transaction command with authority information indicating which operator may execute that particular transaction command.

Incidentally, conceivable methods to attach authority information to transaction commands include having each computer system manage authority information on operators of all the groups. This method, however, presupposes that all computer systems possess data needed for authorization of operations (hereinafter called "authorization data"), and accordingly if authorization data possessed by one computer system is augmented or altered, that augmentation and alternation will have to be reflected in all other computer systems. Therefore, this method requires communication to have the augmentation and alteration reflected in the other computer systems, resulting in a problem of consuming more of system resources and thereby inviting a drop in the overall system performance.

Methods according to the prior art for setting program execution authority (authority for command use) in a network system include one to control execution of transaction jobs on a group-by-group basis in a plurality of computer systems, which is disclosed in the Japanese Patent Application Laid-Open No. Hei 7-219899. However, the technique disclosed by this patent application requires that, where a group authorized to execute transaction jobs is to be registered with an execution authority library, the registration is classified by the computer ID. It also requires setting of information on the opposite computer to be authorized for execution, type of authorization and the like for each set of program data, resulting in complexity of operation.

SUMMARY OF THE INVENTION

An object of the present invention, therefore, is to provide network system and a method capable of limiting the execution of transaction commands entered from one computer system to another without requiring communication to achieve identify authorization data held by the computer systems.

According to an aspect of the present invention, there is provided a network system including a first computer system, a second computer system, and communication lines to connect the first and second computer systems, the first computer system comprising:
  a first memory for storing a first set of authorization data including information on matching between an operator and a group the operator belongs to, and information on matching between a group and commands authorized for operators belonging to the group to execute;
  a first authorization unit for referencing, when a command to be executed by the second computer system is entered by an operator, the first set of authorization data and judging whether or not the operator is to be authorized to execute the command; and
  a first execution unit for augmenting, if the first authorization unit judges that the operator is to be authorized to execute the command, the command with information to identify the group to which the operator belongs, and transmitting the augmented command to the second computer system as a request from the group to execute the command; and the second computer system comprising:
  a second memory for storing a second set of authorization data including information on matching between a group and commands authorized for execution in response to an execution request from the group;
  a second authorization unit for referencing, when the command is received from the first computer system, the second set of authorization data and judging whether or not the command is to be authorized for execution in response to the execution request from the group whose command is augmented with identifying information; and
  a second execution unit for executing the command, if the second authorization unit judges that the command is to be authorized for execution, in response to the execution request from the group.

According to another aspect of the present invention, in the foregoing network system,
  the second set of authorization data further includes information on matching between a group and data to which access is to be authorized in response to the execution request from the group;
  the second authorization unit references the second set of authorization data and judges whether or not the data to be accessed by the command are to be allowed access to in response to the request from the group whose command is augmented with identifying information; and
  the second execution unit, if the second authorization unit judges that the data may be allowed access to in response to the request from the group, executes the command.

According to still another aspect of the present invention, in the foregoing network system,
  the first execution unit further augments the command with operator identifying information and transmits it to the second computer system;
  the second memory further stores a list of unauthorized operators matching commands and operators unauthorized to execute the respective commands;

the second authorization unit refers to the list of unauthorized operators and judges whether or not the operator whose command is augmented with identifying information is to be authorized to execute the command; and the second execution unit, if the second authorization unit judges that the operator is not be authorized to execute the command, does not execute the command.

According to still another aspect of the present invention, there is provided a method to limit the execution of commands, comprising:

a first registration step to register with a first computer system a first set of authorization data including information on matching between an operator and a group the operator belongs to, and information on matching between a group and commands authorized for operators belonging to the group to execute;

a second registration step to register with a second computer system a second set of authorization data including information on matching between a group and commands authorized for execution in response to an execution request from the group;

a first authorization step to reference, when a command to be executed by the second computer system is entered by an operator into the first computer system, the first set of authorization data and to judge whether or not the operator is to be authorized to execute the command; and a first execution step to augment, if it is judged at the first authorization step that the operator is to be authorized to execute the command, the command with information to identify the group to which the operator belongs, and to transmit the augmented command from the first computer system to the second computer system as a request from the group to execute the command; and a second authorization step to reference, when the second computer system receives the command from the first computer system, the second set of authorization data and to judge whether or not the command is to be authorized for execution in response to the execution request from the group whose command is augmented with identifying information; and a second execution step to have the command executed by the second computer system, if it is judged at the second authorization step that the command is to be authorized for execution, in response to the execution request from the group.

According to still another aspect of the present invention, in the foregoing method, the second set of authorization data further includes information on matching between a group and data to which access is to be authorized in response to the execution request from the group;

at the second authorization step it is judged whether or not the data to be accessed by the command are to be allowed access to in response to the request from the group whose command is augmented with identifying information; and at the second execution step, if it is judged at the second authorization step that the data may be allowed access to in response to the request from the group, the command is executed.

According to still another aspect of the present invention, in the foregoing method, at the first execution step, the command is further augmented with operator identifying information and transmitted to the second computer system;

at the second registration step, a list of unauthorized operators matching commands and operators unauthorized to execute the respective commands is further registered;

at the second authorization step, the list of unauthorized operators is referenced, and it is judged whether or not the operator whose command is augmented with identifying information is to be authorized to execute the command; and at the second execution step, if it is judged at the second authorization step that the operator is not be authorized to execute the command, the command is not executed.

According to still another aspect of the present invention, there is provided a storage medium recording thereon a program enabling:

a first computer system to execute first registration processing to register a first set of authorization data including information on matching between an operator and a group the operator belongs to, and information on matching between a group and commands authorized for operators belonging to the group;

a second computer system to execute second registration processing to register a second set of authorization data including information on matching between a group and commands authorized for execution in response to an execution request from the group;

the first computer system to execute first authorization processing to reference, when a command to be executed by the second computer system is entered by an operator, the first set of authorization data and to judge whether or not the operator is to be authorized to execute the command;

the first computer system to execute first execution processing to augment, if it is judged by the first authorization processing that the operator is to be authorized to execute the command, the command with information to identify the group to which the operator belongs, and to transmit the augmented command to the second computer system as a request from the group to execute the command;

the second computer system to execute second authorization processing to reference, when the command is received from the first computer system, the second set of authorization data and to judge whether or not the command is to be authorized for execution in response to the execution request from the group whose command is augmented with identifying information; and the second computer system to execute second execution processing to execute the command, if it is judged by the second authorization processing that the command is to be authorized for execution, in response to the execution request from the group.

According to still another aspect of the present invention, in the foregoing recording medium, the second set of authorization data further includes information on matching between a group and data to which access is to be authorized in response to the execution request from the group;

by the second authorization processing it is judged whether or not the data to be accessed by the command are to be allowed access to in response to the request from the group whose command is augmented with identifying information; and by the second execution processing, if it is judged by said second authorization processing that the data may be allowed access to in response to the request from the group, the command is executed.

According to still another aspect of the present invention, the foregoing recording medium, in the first execution processing, the command is further augmented with operator identifying information and transmitted to the second computer system;

in the second registration processing, a list of unauthorized operators matching commands and operators unauthorized to execute the respective commands is further registered;

in the second authorization processing, the list of unauthorized operators is referenced, and it is judged whether or not the operator whose command is augmented with identifying information is to be authorized to execute the command; and in the second execution processing, if the second authorization unit judges that the operator is not be authorized to execute the command, the command is not executed.

BRIEF DESCRIPTION OF THE DRAWINGS

Other features and advantages of the invention will become apparent from the detailed description hereunder, when taken in conjunction with the accompanying drawings, wherein:

FIG. 1 is a block diagram illustrating the configuration of a first preferred embodiment of the present invention;

FIG. 2 is a flow chart showing the operations of an issuing subsystem to register authorization data in the first embodiment of the invention;

FIG. 3 is a flow chart showing the operations of an executing subsystem to register authorization data in the first embodiment of the invention;

FIG. 4 is a flow chart showing the operations of an issuing subsystem to perform authorization in the first embodiment of the invention;

FIG. 9 is a flow chart showing the operations of an executing subsystem in the third embodiment of the invention.

DETAILED DESCRIPTION OF THE PREFERRED EMBODIMENTS

Figure 5:
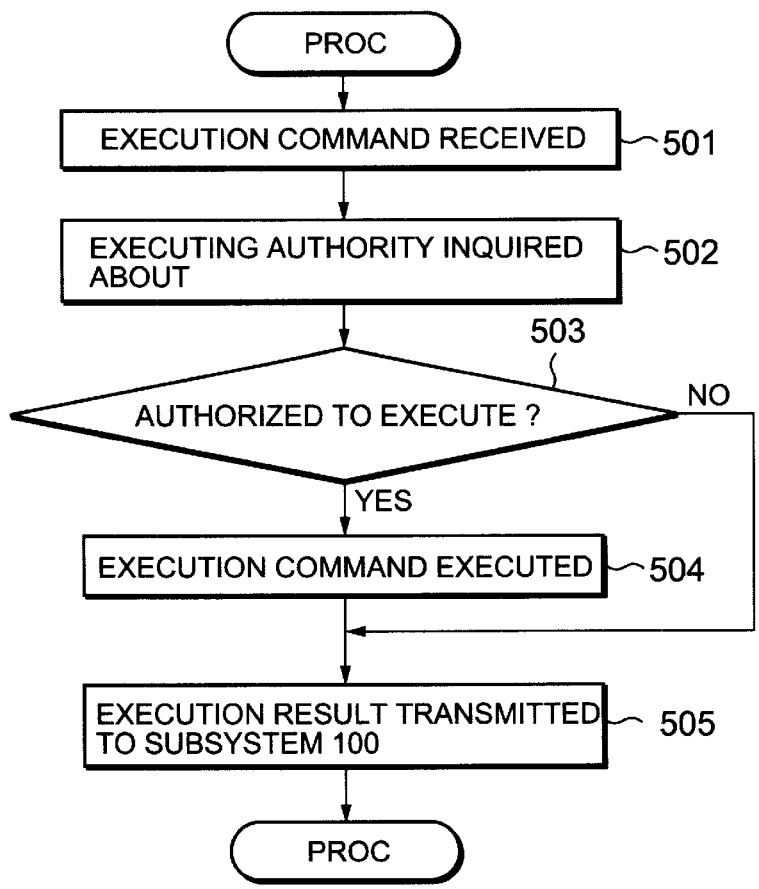
FIG. 5 is a flow chart showing the operations of an executing subsystem to perform authorization in the first embodiment of the invention.

A first embodiment of the present invention will be described in detail below with reference to drawings.

Referring to FIG. 1, a network system, which is a preferred embodiment of the invention, consists of subsystems 100 and 300 connected by a communication line 200. Although only two subsystems are shown in FIG. 1, the number of subsystems is not limited to two. Furthermore, in this embodiment, the subsystem 100 is supposed to be a subsystem to issue transaction commands (hereinafter called "issuing subsystem"), and the subsystem 300, a subsystem to execute transaction commands (hereinafter "executing subsystem"). However, whether any one of subsystems is to issue or to execute transaction commands is determined in its relationship to other subsystems. Therefore, in practical administration, each of the subsystems constituting a network system can either be an issuing subsystem or an executing subsystem.

As illustrated, the subsystem 100 is provided with an authorization data terminal 110 to enter authorization data, an execution server 120 to perform execution control, an authorization server 130 to register authorization data entered from the authorization data terminal 110 and to perform checking with the authorization data, and a transaction terminal 140 to enter transaction commands.

Further the subsystem 300 is provided with an authorization data terminal 310, an execution server 320, authorization server 330 and a transaction terminal 340, each having a configuration similar to its counterpart in the subsystem 100.

In FIG. 1, only characteristic parts of the configuration of this embodiment are shown, but the illustration of other general aspects is dispensed with.

The authorization data terminal 110 is further provided with, a communication unit 111 for transmitting and receiving data, an input unit 112 for entering authorization data, and a the display unit 113 for displaying data. The communication unit 111 is realized with an interface suitable for communication with the execution server 120, the input unit 112, with a keyboard or a mouse for instance, and the display unit 113, with a usual display device for example. Each of the communication unit 311, the input unit 312 and the display unit 313 constituting the authorization data terminal 310 has a configuration similar to its counterpart in the authorization data terminal 110.

The execution server 120 is provided with a decision unit 121 for controlling the execution of commands, an execution unit 122 for actually processing commands, and a communication unit 123. The decision unit 121 and the execution unit 122 are realized with, for instance, a CPU under programmed control and a RAM or some other internal memory, and the communication unit 123 is realized with an interface suitable for communication with the authorization data terminal 110, the authorization server 130 and the transaction terminal 140. In the execution server 320, a decision unit 321, an execution unit 322 and a communication unit 323 have configurations similar to their respective counterparts in the execution server 120.

The authorization server 130 is provided with a data storage unit 131 for keeping authorization data and a communication unit 132. The data storage unit 131 is realized with, for instance, a magnetic disk apparatus, a photomagnetic disk apparatus or some other external memory, and the communication unit 132, with an interface suitable for communication with the execution server 120. The authorization server 330 is provided with a data storage unit 331 and a communication unit 332, each having a configuration similar to its counterpart in the authorization server 130.

The transaction terminal 140 is provided with a communication unit 141, an input unit 142 for entering commands and a display unit 143 for displaying the results of command execution and the like. The communication unit 141 is realized with an interface suitable for communication with the execution server 120, the input unit 142, with a keyboard or a mouse, for instance, and the display unit 143, with a display apparatus for example. The transaction terminal 340 is provided with a communication unit 341, an input unit 342 and a display unit 343 configured similarly to their respective counterparts in the transaction terminal 140.

In the foregoing configuration, the subsystems 100 and 300 are installed corresponding to groups situated in positions geographically distant from each other. In the context of the present invention as well, the "group" may be a group of any size, ranging from a large organization such as a corporation to a small one such as a department or a section in a corporation. Conceivable ways of being "installed corresponding to groups" include installation of one computer system for each group, installation of one computer system for a plurality of groups, and installation of a plurality of computer systems for one group.

Further in each of the subsystems 100 and 300, there may be a plurality each of authorization data terminals 110 and 310 and transaction terminal 140 and 340. Thus in this embodiment, even if a plurality of transaction terminals 140 or 340 to perform prescribed transactions exist in one group (the subsystem 100 or 300), one authorization server 130 or 330 can manage operator authorization data.

Servers and terminals in each subsystem are realized with personal computers, work stations or some other computer systems. The functions of each server or terminal is realized by the control of the data processing unit of the computer system by a computer program. The computer program is provided stored, as illustrated, in a magnetic disk, an optical disk, a semiconductor memory, or some other usual storage medium 400. The authorization data terminal 110 and the transaction terminal 140, or the authorization data terminal 310 and the transaction terminal 340, may consist of physically the same computer system.

Next will be described the operations of this embodiment with reference to flow charts of FIG. 2 to FIG. 5. The operations of this embodiment consist of operations to register authorization data and operations to authorize a service command in the computer system of another group, entered by an operator.

First will be described operations to register authorization data with reference to FIG. 2 and FIG. 3. As the subsystem 100 is an issuing subsystem for transaction commands and the subsystem 300, an executing subsystem for transaction commands, each subsystem registers authorization data as its role requires.

As a system manager belonging to the group for which the subsystem 100 is installed enters authorization data using the input unit 112 and the display unit 113 of the authorization data terminal 110 (step 201), the authorization data terminal 110 transmits the authorization data to the authorization server 130 using the communication unit 111 (step 202). The authorization data registered here with the subsystem 100 include the operator name of an operator authorized to log on the subsystem 100, a password, information on matching between the group name of the group that operator belongs to and information on matching between the command name of a transaction command and the group name of a group authorized to execute that transaction command.

The authorization server 130, upon receiving from the communication unit 132 authorization data transmitted from the authorization data terminal 110, registers the authorization data with the data storage unit 131 (step 203).

Or when a system manager belonging to the group for whom the subsystem 300 is installed enters authorization data using the input unit 312 and the display unit 313 of the authorization data terminal 310 (step 301), the authorization data terminal 310, using the communication unit 311, transmits the authorization data to the authorization server 330 (step 302). The authorization data registered herewith the subsystem 300 include information on matching between the command name of a transaction command registered with the subsystem 100 and the group name of a group authorized to execute that transaction command and information on matching between the group name of a group authorized to use the subsystem 100 and the group name of a group having an authority equal to that group in the subsystem 300. The authorization data also include, where the transaction command is to access a prescribed set of data, information on matching between the data and the group name of a group authorized to access the data.

The authorization server 330, upon receiving from the communication unit 332 the authorization data transmitted from the authorization data terminal 310, registers the authorization data with the data storage unit 331 (step 303). This completes the registration of the authorization data.

Next, will be described authorization operations where an operator of the group for which the subsystem 100 is installed has entered from the transaction terminal 140 an instruction to execute a transaction command on the subsystem 300 with reference to FIG. 4 and FIG. 5.

The instruction to execute the transaction command entered by the operator is transmitted from the transaction terminal 140 to the execution server 120 via the communication unit 141 (steps 401, 402). The execution server 120, accepting the instruction to execute the transaction command, inquires of the authorization server 130 to check whether or not the operator is authorized to log on the subsystem 100 (including a check to see whether or not the operator is authorized to execute that particular transaction command (step 403).

If the authorization server 130 judges that the operator is authorized to log on the subsystem 100, the execution server 120 will send the transaction command to the execution server of the subsystem 300 via the communication line 200 (steps 404, 405). On this occasion, the transaction command is augmented with the group name of the group the operator belongs to (hereinafter this augmented group name will be called the "issuing operator group name"). Or, if the authorization server 130 judges that the operator is not authorized to execute the transaction command, error processing, such as displaying an error message at the authorization data terminal 110, will take place and the processing will be completed (steps 404, 406).

The execution server 320 of the subsystem 300 inquires of the authorization server 330 whether the issuing operator group name added to the transaction command sent from the subsystem 100 represents a group authorized to use that particular transaction command (steps 501, 502). If the authorization server 330, as a result of its checking, authorizes the group to which the operator belongs to use the transaction command, the execution server 320 will execute the transaction command (steps 503, 504), and returns the result of execution to the subsystem 100 (step 505). If the authorization server 330 does not authorize the group to which the operator belongs to use the transaction command, the execution server 320 does not execute the transaction command, and notifies the subsystem 100 of its non-execution as the result of execution (step 505). Then error processing, such as displaying an error message at the authorization data terminal 110, will take place and the processing will be completed.

As described so far, in this embodiment, authorization of an operation to use a transaction command is accomplished by a transaction command issuing subsystem. If the transaction command is a command to be executed in some other subsystem, the transaction command is augmented with an issuing operator group name, i.e. the operator name is replaced with the operator group name, and transmitted to the executing subsystem. The executing subsystem can check the authority to use the transaction command on the basis of the issuing operator group name added to the transaction command.

Therefore, where an operator is to be added or some other change to be made at the executing subsystem, there is no need to shift authorization data pertaining to the addition or the like between subsystems. Thus, even if there is such an addition of the like, the authority to execute the transaction command can be checked without having to notify the other subsystem of the addition or the like.

Incidentally, while it is supposed in this embodiment to add, when a transaction command is to be transmitted to another subsystem, the group name of the group to which the operator belongs, i.e. the issuing operator group name is to be added to the transaction command, an alternative way is to arrange in advance that the name of the subsystem (hereinafter called the "subsystem name") should always be added to the operator name or the terminal name and, when sending a transaction command from the subsystem 100 to the subsystem 300, the operator name or the terminal name should be added in place of the issuing operator group name.

In this case, the subsystem 300 can use the subsystem name as the group name in registering authorization data with the authorization server 330. Then the authority to execute would be recognized on a subsystem-by-subsystem basis.

If a transaction command is entered into the subsystem 100 in this state, the transaction command will be augmented with an operator name or a terminal name when it is to be transmitted from the subsystem 100 to the subsystem 300. The execution server 320 of the subsystem 300, having received the transaction command, extracts the subsystem name of the subsystem 100 from the operator name of the operator having entered the transaction command, added to the received transaction command or from the terminal name of the terminal into which the transaction command has been entered, and inquires of the authorization server 330 about the authority to execute on the basis of the extracted subsystem name. The authorization server 330 checks the authority to execute, and returns the result of the check to the execution server 320.

In this manner as well, in a network system connecting a plurality of subsystems, execution authority can be controlled for each individual transaction command with respect to each subsystem.

Next will be described in detail a second preferred embodiment of the present invention with reference to drawings.

Figure 7:
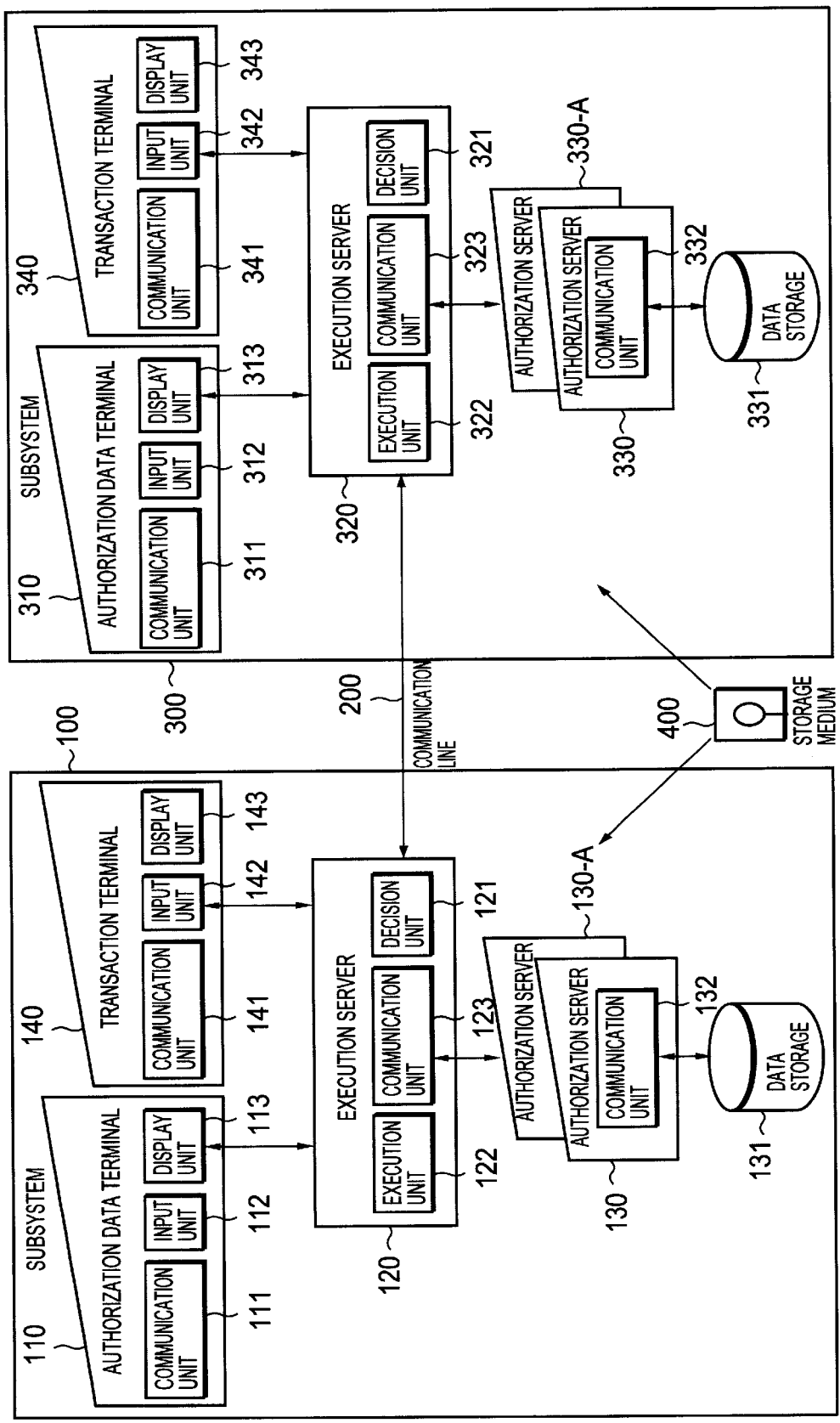
FIG. 7 is a block diagram illustrating the configuration of a second preferred embodiment of the present invention.

Referring to FIG. 7, the network system of this embodiment consists of subsystems 100 and 300 connected by a communication line 200. Although only two subsystems are shown in FIG. 7, the number of subsystems is not limited to what is shown here.

As illustrated, the subsystem 100 is provided with an authorization data terminal 110 for registering authorization data, an execution server 120 for performing execution control, an authorization server 130 for checking authorization, and a transaction terminal 140 for entering transaction commands.

Further the subsystem 300 is provided with an authorization data terminal 310, an execution server 320, authorization server 330 and a transaction terminal 340, each having a configuration similar to its counterpart in the subsystem 100.

In FIG. 7, only characteristic parts of the configuration of this embodiment are shown, but the illustration of other general aspects is dispensed with.

In this embodiment, each of the subsystems 100 and 300 is provided with a duplicate of the authorization server 130 or 330, respectively. The registered contents of duplicate authorization servers 130-A and 330-A are always kept identical with the regular authorization servers 130 and 330, respectively. Thus, once a new set of authorization data is registered with the authorization server 130 or 330, the same set of authorization data is immediately registered with the authorization server 130-A or 330-A, respectively.

When the decision unit 121 or 321, respectively, of the execution server 120 or 320 is to inquire about authorization data, the duplicate authorization server 130-A or 330-A performs authorization, depending on conditions. For instance, if the authorization server 130 or the authorization server 330 is not operating normally, the normally operating duplicate authorization server 130-A or 330-A will take charge of the processing on its behalf.

Since other aspects of configuration and operations are similar to those of the foregoing first embodiment, their description is dispensed with here.

Next will be described in detail a third preferred embodiment of the present invention with reference to drawings.

Figure 8:
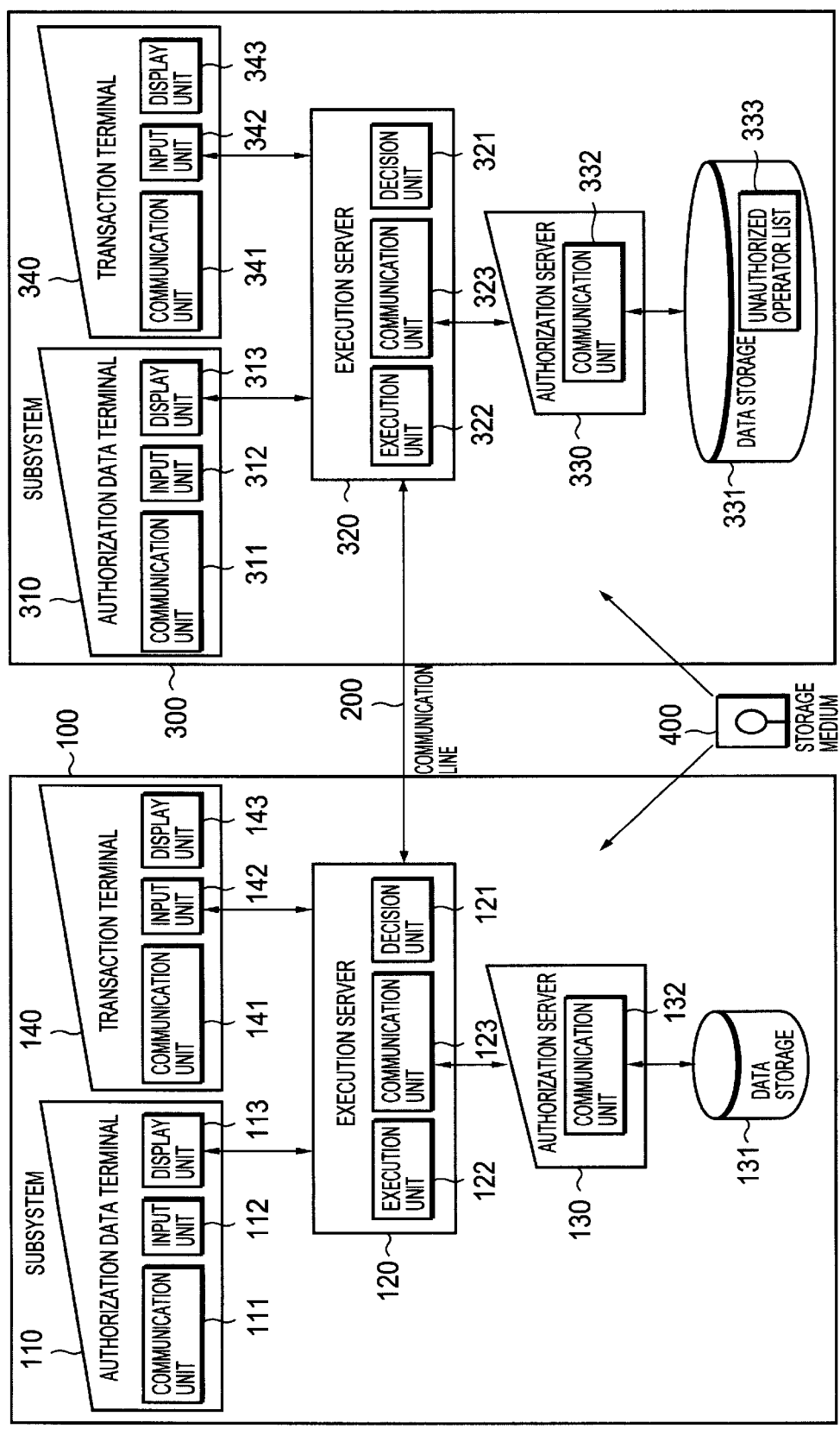
FIG. 8 is a block diagram illustrating the configuration of a third preferred embodiment of the present invention.

Referring to FIG. 8, the network system of this embodiment consists of subsystems 100 and 300 connected by a communication line 200. Although only two subsystems are shown in FIG. 8, the number of subsystems is not limited to what is shown here.

As illustrated, the subsystem 100 is provided with an authorization data terminal 110 for registering authorization data, an execution server 120 for performing execution control, an authorization server 130 for checking authorization, and a transaction terminal 140 for entering transaction commands.

Further the subsystem 300 is provided with an authorization data terminal 310, an execution server 320, authorization server 330 and a transaction terminal 340, each having a configuration similar to its counterpart in the subsystem 100.

In FIG. 8, only characteristic parts of the configuration of this embodiment are shown, but the illustration of other general aspects is dispensed with.

In this embodiment, as illustrated in FIG. 8, a data storage unit 331 of the authorization server 330 of the subsystem 300 stores a list of unauthorized operators 333 in which are registered the operator names of operators not authorized to execute commands whose processing in the subsystem 300 is requested.

Operations of this embodiment will be described with reference to FIG. 9.

In this embodiment, the operator names of operators who are not authorized to execute commands with the subsystem 300 are entered in advance from the authorization data terminal 310 of the subsystem 300 (step 901), and the operator names are registered into the list of unauthorized operators 333 stored in the data storage unit 331 of the authorization server 330 (steps 902, 903).

The execution server 120 transmits a transaction command augmented with a group name and an operator name to the execution server 320, and the authorization server 330, upon receiving an inquiry from the decision unit 321 of the execution server 320 about command execution authority (steps 1001, 1002), first references the list of unauthorized operators 333 and, if operator A is found among unauthorized operator names, will return to the decision unit 321 the authorization result that A is not authorized to execute transaction commands (step 1003). Since subsequent operations (step 1004 to step 1006) are the same as the authorization operations of the subsystem 300 (step 503 to step 505) in the first embodiment illustrated in FIG. 5, their description is dispensed with here.

By introducing the list of unauthorized operators which individually specifies operators whose request for the execution of transaction commands are not to be complied with, it is made possible not to authorize command execution in the subsystem 300 by operator A, who is in a group whose execution has been authorized by error in the subsystem 100, resulting in ability to limit the use of commands more elaborately.

Next will be described operations of the foregoing embodiment with reference to a specific example.

First will be described registration of authorization data in the subsystem 100. The system manager of the subsystem 100, using the input unit 112 at the authorization data terminal 110, enters information on an operator to be authorized to log on, the usable type of command, the range of accessible data, and other authorization data (step 201 in FIG. 2) and, after confirming the input information on the display unit 113, transmits it to the authorization server 130 with the communication unit 111 (step 202 in FIG. 2).

The authorization server 130, after checking authorization data sent from the authorization data terminal 110, registers them with the data storage unit 131 operator by operator and group by group (step 203 in FIG. 2). The registered authorization data in the authorization server 130 of the subsystem 100 are supposed to have the following contents.

Registered authorization data
Operator information
Operator A: Group A-1@100
Operator B Group B-1@100
Command authority
Group A-1@100 Command a@100,
Command b@300
Group B-1@100 Command c@100

In the foregoing registration authorization data, operator information indicates that operator A belongs to group A-1@100 matching the subsystem 100, and operator B, to group B-1@100 matching the subsystem 100. It is further indicated that the command authority covers the execution by group A-1@100 of command a@100 to access data stored in the subsystem 100 and command b@300 to access data stored in the subsystem 300, and that by group B-1@100 of command c@100 to access data stored in the subsystem 100.

Next will be described the registration of authorization data in the subsystem 300. The system manager of the subsystem 300, using the input unit 312 at the authorization data terminal 110, enters information on the usable type of command for the operator group of the subsystem 100, the range of accessible data, and other authorization data (step 301 in FIG. 3) and, after confirming the input information on the display unit 313, transmits it to the authorization server 330 with the communication unit 311 (step 302 in FIG. 3).

The authorization server 330, after checking authorization data sent from the authorization data terminal 310, registers them with the data storage unit 331 operator by operator and group by group (step 303 in FIG. 3). The registered authorization data in the authorization server 330 of the subsystem 300 are supposed to have the following contents.

Registered authorization data
Command authority
Group A-2@400 Command a@300
Command b@300
Data access authority
Group b-2@300 Data d-300,
Group dependence relationship
Group A-1@100 Group A-2@300
Group b-2@300

The command authority in the foregoing registered authorization data indicates that group A-2@300 is authorized to execute command a@300 and command b@300 to access data stored in the subsystem 300. The group dependence relationship indicates that group A-1@100 matching the subsystem 100 has comparable authority what is assigned to group A-2@300 and group b-2@300 in the subsystem 300

Figure 6:
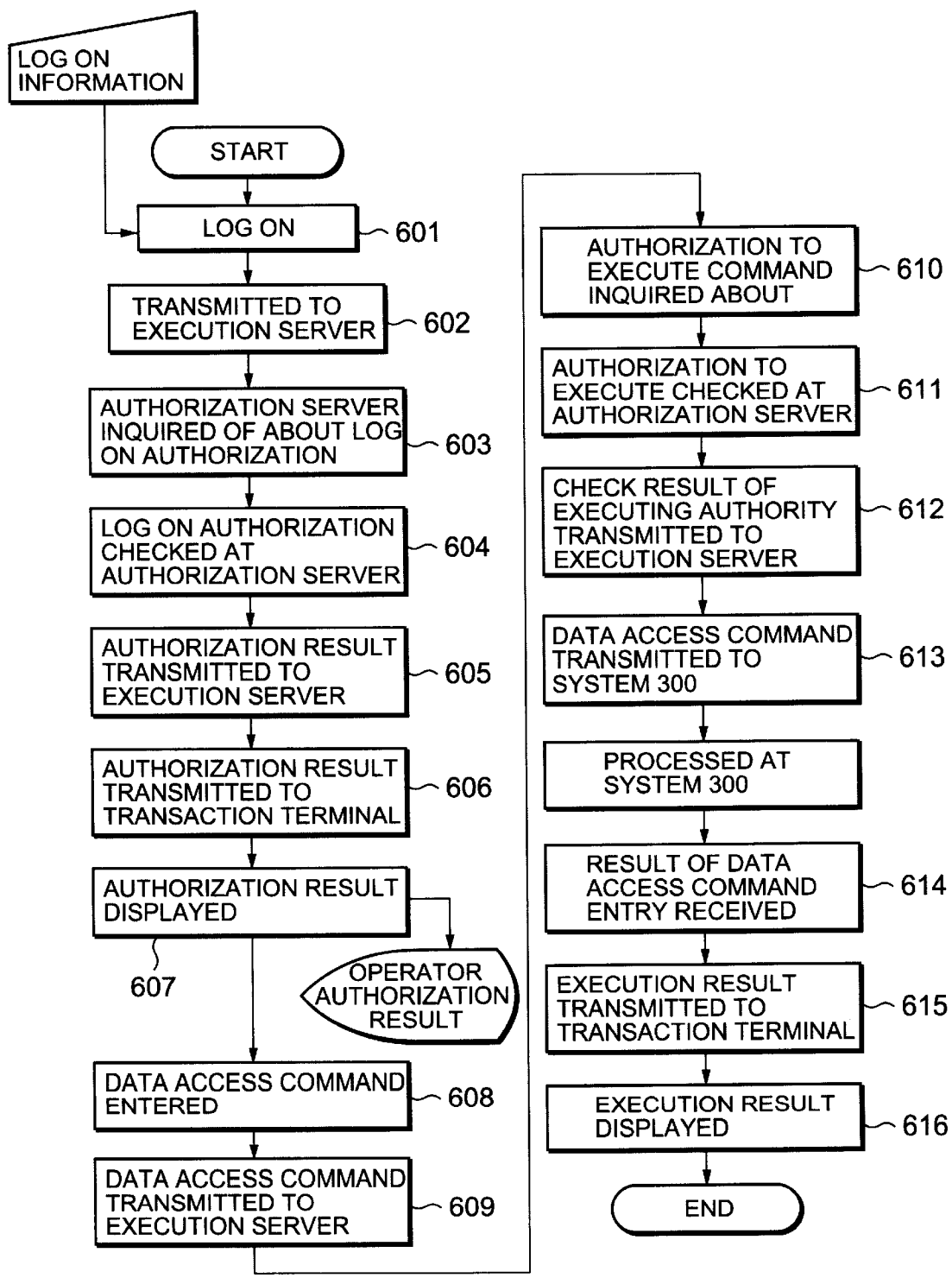
FIG. 6 is a flow chart showing details of the operations of an issuing subsystem to perform authorization in the first embodiment of the invention.

Next will be described, with reference to the flow chart of FIG. 6, the authorization operations which take place when operator A belonging to group A-1@100 matching the subsystem 100 is to access data stored in the subsystem 300.

As operator A, to log on the subsystem 100, enters such log on information as the operator name and password using the input unit 142 and the display unit 143 of the execution terminal 140 (step 601), the transaction terminal 140 transmits the log on information to the execution server 120, using the communication unit 141 (step 602).

A decision unit of the execution server 120, upon receiving with the communication unit 123 the log-on information entered into the transaction terminal 140, inquires of the authorization server 130 whether or not the log-on by the pertinent operator is authorized (step 603).

The authorization server 130, upon receiving with the communication unit 132 the log-on information sent from the execution server 120, compares the log-on information with the authorization information registered with the data storage unit 131, and judges whether or not operator A is authorized to log on (step 604). The result of judgment is transmitted to the execution server 120, using the communication unit 132 (step 605).

The execution server 120 transmits to the transaction terminal 140 the result of authorization received from the authorization server 130 (step 606), and the transaction terminal 140 displays the result of authorization on the display unit 143 (step 607). Operator A receives the result of log-on authorization by visually perceiving the displayed result on the display unit 143. Here, since operator A is registered in the operator information among the registration authorization data of the authorization server 130, the result of authorization is that his or her log-on is authorized.

Next supposed that operator A has entered from the input unit 142 a command b@300 to access data d-300 in the subsystem 300 from the transaction terminal 140 (step 608). The transaction terminal 140, using the communication unit 141, transmits the command to the execution server 120 (step 609).

When the execution server 120 receives the command b@300 sent from the transaction terminal 140, its decision unit 121 inquires of the authorization server 130 whether or not operator A is authorized to execute the command b@300 (step 610).

The authorization server 130, referencing the data storage unit 131, knows that operator A belongs to group A-1@100, and that group A-1@100 is authorized to execute command a@100 and command b@300, and judges that operator A is authorized to execute command b@300 (step 611). It returns the acquired result of authorization to the execution server 120 (step 612).

In the execution server 120, the decision unit 121, upon receiving the result of authorization by the authorization server 130 via the communication unit 123, authorizes execution of the command b@300, and transmits a request for execution of the command b@300 to the subsystem 300 via the communication line 200 (step 613). In doing so, it augments the request for command execution with group A-1@100 to which operator A belongs.

In the subsystem 300, when the decision unit 321 of the execution server 320 receives the command b@300 and information on group A-1@100 from the communication lines 200 (step 501 in FIG. 5), it inquires of the authorization server 330 whether or not the combination of the command and the group is authorized for execution (step 502 in FIG. 5). Here, as group A-1@100 has an authority which is granted to group A-2@300, and that group A-2@300 is authorized to use the command b@300, the result of authorization to permit execution is returned from the authorization server 330 to the execution server 320 (step 503 in FIG. 5).

Further, since group A-1@100 has an authority which is granted to group B-2@300 and that group B-2@300 is authorized to access data d-300, the decision unit 321 authorizes execution of the command b@300, hands over the processing to the execution unit 322, and executes the command b@300 to access data d-300 (step 504 in FIG. 5). The result of execution of the command b@300 is transmitted to the execution server 120 of the subsystem 100, using the communication line 200 (step 505 in FIG. 5).

Referring again to FIG. 6, the execution server 120 of the subsystem 100 receives the result of execution of the command b@300 sent via the network 200 (step 614), and transmits the result of execution to the transaction terminal 140 (step 615). The transaction terminal 140, upon receiving the result of execution of the command b@300, displays the result of execution on the display unit 143 (step 616). This enables operator A to check the result of entry of the command b@300.

The present invention has been described so far with reference to some preferred embodiments thereof, the invention is not necessarily restricted to the foregoing embodiments.

As hitherto described, a network system and a method to limit the execution of commands according to the invention, as authorization of the operator having instructed the execution of transaction command is accomplished by the issuing subsystem, there is no need for the authorization to be accomplished by the subsystem to execute the command. As a result, there is no need for communication to make authorization data held by all the subsystems identical, resulting in the advantages of reducing unnecessary consumption of system resources and avoiding performance deterioration of the system.

Also, the invention, by giving authorization regarding transaction commands in the executing subsystem to each group to which operators belong, there is no need for communication between subsystems to make authorization data identical even if there is any addition or alteration of issuing subsystems of or operators to issue transaction commands unless no group is added or altered, resulting in another advantage of further simplifying the system management.

What is claimed is:

1. A network system including a first computer system, a second computer system, and communication lines to connect said first and second computer systems,
said first computer system comprising:
  a first memory for storing a first set of authorization data including information on matching between an operator and a group the operator belongs to, and information on matching between a group and commands authorized for operators belonging to the group to execute;
  a first authorization unit for referencing, when a command to be executed by said second computer system is entered by an operator, said first set of authorization data and judging whether or not the operator is to be authorized to execute the command; and
  a first execution unit for augmenting, if said first authorization unit judges that the operator is to be authorized to execute the command, the command with information to identify the group to which the operator belongs, and transmitting the augmented command to said second computer system as a request from the group to execute the command; and
said second computer system comprising:
  a second memory for storing a second set of authorization data including information on matching between a group and commands authorized for execution in response to an execution request from the group;
  a second authorization unit for referencing, when the command is received from said first computer system, said second set of authorization data and judging whether or not the command is to be authorized for execution in response to the execution request from the group whose command is augmented with identifying information; and
  a second execution unit for executing the command, if said second authorization unit judges that the command is to be authorized for execution, in response to the execution request from the group.

2. A network system, as claimed in claim 1, wherein:
said second set of authorization data further includes information on matching between a group and data to which access is to be authorized in response to the execution request from the group;
said second authorization unit references said second set of authorization data and judges whether or not the data to be accessed by the command are to be allowed access to in response to the request from the group whose command is augmented with identifying information; and
said second execution unit, if said second authorization unit judges that the data may be allowed access to in response to the request from the group, executes the command.

3. A network system, as claimed in claim 1, wherein:
said first execution unit further augments the command with operator identifying information and transmits it to said second computer system;
said second memory further stores a list of unauthorized operators matching commands and operators unauthorized to execute the respective commands;
said second authorization unit refers to said list of unauthorized operators and judges whether or not the operator whose command is augmented with identifying information is to be authorized to execute the command; and
said second execution unit, if said second authorization unit judges that the operator is not be authorized to execute the command, does not execute the command.

4. A network system, as claimed in claim 1, wherein the operator that entered the command to be executed by the second computer system is an operator of the first computer system.

5. A network system, as claimed in claim 4, wherein the identifying information augmented with the command, as received by the second authorization unit, does not include any information identifying the operator but rather only identifies the group that the operator of the first computer system is a member of.

6. A method to limit the execution of commands, comprising:

a first registration step to register with a first computer system a first set of authorization data including information on matching between an operator and a group the operator belongs to, and information on matching between a group and commands authorized for operators belonging to the group to execute;

a second registration step to register with a second computer system a second set of authorization data including information on matching between a group and commands authorized for execution in response to an execution request from the group;

a first authorization step to reference, when a command to be executed by said second computer system is entered by an operator into said first computer system, the first set of authorization data and to judge whether or not the operator is to be authorized to execute the command; and a first execution step to augment, if it is judged at said first authorization step that the operator is to be authorized to execute the command, the command with information to identify the group to which the operator belongs, and to transmit the augmented command from said first computer system to said second computer system as a request from the group to execute the command; and a second authorization step to reference, when said second computer system receives said command is received from said first computer system, said second set of authorization data and to judge whether or not the command is to be authorized for execution in response to the execution request from the group whose command is augmented with identifying information; and a second execution step to have the command executed by said second computer system, if it is judged at said second authorization step that the command is to be authorized for execution, in response to the execution request from the group.

7. A method, as claimed in claim 6, wherein:

said second set of authorization data further includes information on matching between a group and data to which access is to be authorized in response to the execution request from the group;

at said second authorization step it is judged whether or not the data to be accessed by the command are to be allowed access to in response to the request from the group whose command is augmented with identifying information; and at said second execution step, if it is judged at said second authorization step that the data may be allowed access to in response to the request from the group, the command is executed.

8. A method, as claimed in claim 6, wherein:

at said first execution step, the command is further augmented with operator identifying information and transmitted to the second computer system;

at said second registration step, a list of unauthorized operators matching commands and operators unauthorized to execute the respective commands is further registered;

at said second authorization step, said list of unauthorized operators is referenced, and it is judged whether or not the operator whose command is augmented with identifying information is to be authorized to execute the command; and at said second execution step, if it is judged at said second authorization step that the operator is not be authorized to execute the command, the command is not executed.

9. A method, as claimed in claim 6, wherein the operator that entered the command to be executed by the second computer system is an operator of the first computer system.

10. A method, as claimed in claim 9, wherein the identifying information augmented with the command, as received in the second authorization step, does not include any information identifying the operator but rather only identifies the group that the operator of the first computer system is a member of.

11. A storage medium recording thereon a program enabling:

a first computer system to execute first registration processing to register a first set of authorization data including information on matching between an operator and a group the operator belongs to, and information on matching between a group and commands authorized for operators belonging to the group;

a second computer system to execute second registration processing to register a second set of authorization data including information on matching between a group and commands authorized for execution in response to an execution request from the group;

said first computer system to execute first authorization processing to reference, when a command to be executed by said second computer system is entered by an operator, said first set of authorization data and to judge whether or not the operator is to be authorized to execute the command;

said first computer system to execute first execution processing to augment, if it is judged by said first authorization processing that the operator is to be authorized to execute the command, the command with information to identify the group to which the operator belongs, and to transmit the augmented command to said second computer system as a request from the group to execute the command;

said second computer system to execute second authorization processing to reference, when the command is received from said first computer system, said second set of authorization data and to judge whether or not the command is to be authorized for execution in response to the execution request from the group whose command is augmented with identifying information; and said second computer system to execute second execution processing to execute the command, if it is judged at said second authorization processing that the command is to be authorized for execution, in response to the execution request from the group.

12. A storage medium, as claimed in claim 11, wherein:

said second set of authorization data further includes information on matching between a group and data to which access is to be authorized in response to the execution request from the group;

by said second authorization processing it is judged whether or not the data to be accessed by the command are to be allowed access to in response to the request from the group whose command is augmented with identifying information; and by said second execution processing, if it is judged by said second authorization processing that the data may be allowed access to in response to the request from the group, the command is executed.

13. A storage medium, as claimed in claim 11, wherein:

in said first execution processing, the command is further augmented with operator identifying information and transmitted to said second computer system;

in said second registration processing, a list of unauthorized operators matching commands and operators unauthorized to execute the respective commands is further registered;

in said second authorization processing, said list of unauthorized operators is referenced, and it is judged whether or not the operator whose command is augmented with identifying information is to be authorized to execute the command; and in said second execution processing, if it is judged by said second authorization processing that the operator is not be authorized to execute the command, the command is not executed.

14. A group of storage media wherein said program, as claimed in claim 11, is divided into a plurality of portions, each of which is recorded on one of the plurality of recording media.

15. A group of storage media wherein said program, as claimed in claim 12, is divided into a plurality of portions, each of which is recorded on one of the plurality of recording media.

16. A group of storage media wherein said program, as claimed in claim 13, is divided into a plurality of portions, each of which is recorded on one of the plurality of recording media.

17. A storage medium, as claimed in claim 11, wherein the operator that entered the command to be executed by the second computer system is an operator of the first computer system.

18. A storage medium, as claimed in claim 17, wherein the identifying information augmented with the command, as received by the second computer system and as processed by the second authorization processing, does not include any information identifying the operator but rather only identifies the group that the operator of the first computer system is a member of.

19. A program embodied in electric signals, said program enabling:

a first computer system to execute first registration processing to register a first set of authorization data including information on matching between an operator and a group the operator belongs to, and information on matching between a group and commands authorized for operators belonging to the group;

a second computer system to execute second registration processing to register a second set of authorization data including information on matching between a group and commands authorized for execution in response to an execution request from the group;

said first computer system to execute first authorization processing to reference, when a command to be executed by said second computer system is entered by an operator, said first set of authorization data and to judge whether or not the operator is to be authorized to execute the command;

said first computer system to execute first execution processing to augment, if it is judged by said first authorization processing that the operator is to be authorized to execute the command, the command with information to identify the group to which the operator belongs, and to transmit the augmented command to said second computer system as a request from the group to execute the command;

said second computer system to execute second authorization processing to reference, when the command is received from said first computer system, said second set of authorization data and to judge whether or not the command is to be authorized for execution in response to the execution request from the group whose command is augmented with identifying information; and said second computer system to execute second execution processing to execute the command, if it is judged by said second authorization processing that the command is to be authorized for execution, in response to the execution request from the group.

20. A program, as claimed in claim 19, wherein:

said second set of authorization data further includes information on matching between a group and data to which access is to be authorized in response to the execution request from the group;

by said second authorization processing it is judged whether or not the data to be accessed by the command are to be allowed access to in response to the request from the group whose command is augmented with identifying information; and by said second execution processing, if it is judged by said second authorization processing that the data may be allowed access to in response to the request from the group, the command is executed.

21. A program, as claimed in claim 19, wherein:

in said first execution processing, the command is further augmented with operator identifying information and transmitted to said second computer system;

in said second registration processing, a list of unauthorized operators matching commands and operators unauthorized to execute the respective commands is further registered;

in said second authorization processing, said list of unauthorized operators is referenced, and it is judged whether or not the operator whose command is augmented with identifying information is to be authorized to execute the command; and in said second execution processing, if it is judged by said second authorization processing that the operator is not be authorized to execute the command, the command is not executed.

22. A program, as claimed in claim 19, wherein the operator that entered the command to be executed by the second computer system is an operator of the first computer system.

23. A program, as claimed in claim 22, wherein the identifying information augmented with the command, as received by the second computer system, does not include any information identifying the operator but rather only identifies the group that the operator of the first computer system is a member of.

* * * * *